United States Patent
Torr et al.

(10) Patent No.: US 6,741,757 B1
(45) Date of Patent: May 25, 2004

(54) FEATURE CORRESPONDENCE BETWEEN IMAGES USING AN IMAGE PYRAMID

(75) Inventors: Philip H. S. Torr, Cambridge (GB); Colin Davidson, London (GB)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/519,794

(22) Filed: Mar. 7, 2000

(51) Int. Cl.[7] .................................................. G06K 9/32

(52) U.S. Cl. ...................................... 382/294; 382/285

(58) Field of Search ................................. 382/294, 284, 382/278, 154, 181, 195, 199, 240, 236, 285; 348/47, 42, 580, 584; 345/629, 630

(56) References Cited

U.S. PATENT DOCUMENTS

| | | | | |
|---|---|---|---|---|
| 5,179,441 A | * | 1/1993 | Anderson et al. | 358/88 |
| 5,577,130 A | * | 11/1996 | Wu | 382/106 |
| 5,727,078 A | * | 3/1998 | Chupeau | 382/154 |
| 5,920,657 A | * | 7/1999 | Bender et al. | 382/284 |
| 5,963,664 A | * | 10/1999 | Kumar et al. | 382/154 |
| 6,348,918 B1 | * | 2/2002 | Szeliski et al. | 345/419 |
| 6,353,678 B1 | * | 3/2002 | Guo et al. | 382/284 |
| 6,512,857 B1 | * | 1/2003 | Hsu et al. | 382/294 |
| 6,571,024 B1 | * | 5/2003 | Sawhney et al. | 382/294 |

OTHER PUBLICATIONS

Beardley P., Torr P., Zisserman A., 3D model acquisition from extended image sequences, in Proc. European Conf on Computer Vision, LNCS 1064/1065, pp. 683–695. Springer–Verlag, 1996.

(List continued on next page.)

*Primary Examiner*—Yon J. Couso
(74) *Attorney, Agent, or Firm*—Law Offices of Albert S. Michalik, PLLC

(57) ABSTRACT

Feature correspondence between images using an image pyramid is disclosed. In one embodiment, a fundamental matrix between a first and a second image is generated from the image pyramid. The image pyramid is first generated, and has a predetermined number of fineness levels, from a coarsest to a finest level. Each of the images has significant features at each pyramid level. A plurality of hypotheses, or particles, is generated for the fundamental matrix at the coarsest level, based on matching significant features of the images at the coarsest level. In an iterative procession through the levels of the image pyramid, starting at a present level initially set to the coarsest level and then subsequently advanced by one fineness level upon each iteration, an importance sampling function is first formulated from the hypotheses. The plurality of hypotheses is then generated at the next pyramid level based on the function, and on the significant features of the images at this next level. The iteration is complete when the next level has reached the finest pyramid level. The hypotheses generated at the finest level encapsulate the fundamental matrix together with its uncertainty.

27 Claims, 9 Drawing Sheets

OTHER PUBLICATIONS

J.R. Bergen, P. Anandan, K. Hanna, R. Hingorani, Hierarchical model–based motion estimation, in Proc. $2_{nd}$ European Conf. on Computer Vision, LNCS 588, Santa Margherita Ligure, pp. 237–252, 1992.

M. Isard, A. Blake, Condensation—conditional density propagation for visual tracking, International Journal of Computer Vision, 28(1):5–28, 1998.

P. Pritchett, A. Zisserman, Wide baseline stereo matching, in Proc $6_{th}$ Int'l Conf on Computer Vision, Bombay, pp. 754–760, Jan. 1998.

P. Torr, D. Murray, The development and comparison of robust methods for estimating the fundamental matrix, Int'l Journal of Computer Vision, 24(3):271–300, 1997.

Y. Li, G. Gimel'farb, On estimation of Fundamental Matrix in Computational Stereo, Technical Report #CITR–TR–36, University of Auckland, Computer Science Department, CITR, New Zealand, Nov. 1998.

K. Kanatani, Naoya Ohta, Optimal fundamental matrix computation: algorithm and reliability analysis, Proceedings of the Sixth Symposium on Sensing via Imaging Information (SII 2000), Jun. 14–16, 2000, Yokohama, Japan (downloaded from Internet on Feb. 10, 2000).

R. Mohr, B. Triggs, Projective Geometry for Image Analysis, A Tutorial given at ISPRS, Vienna, Jul. 1996.

Z. Zhang, R. Deriche, O. Faugeras, Q.–T. Luong. *Artificial Intelligence Journal*, vol. 78, pp. 87–119, Oct. 1995. Also Research Report No.2273, INRIA Sophia–Antipolis, May 1994.

\* cited by examiner

400

402

FEATURE CORRESPONDENCE BETWEEN IMAGES USING AN IMAGE PYRAMID

FIELD OF THE INVENTION

This invention relates generally to the correspondence of features, such as pixels, between a pair of images, such as from a video sequence, and more particularly to such correspondence using an image pyramid.

BACKGROUND OF THE INVENTION

An increasingly common computer application is computer vision. In one type of computer vision application, the three-dimensional (3D) structure, as well as other information, is desired to be obtained from a video sequence of images, such as can be obtained from a hand-held camcorder, for instance. This information can then be used, for example, for building a three-dimensional (3D) graphical model from the image sequence. This information can also be used to compress the video sequence of images.

One of the bottlenecks in such computer vision applications remains matching different images of a single scene, which is also referred to as feature correspondence between images. For example, in FIG. 2, between consecutive images 200 and 202 of a video sequence, a bird 204 has moved from the left to the right. Feature correspondence, as represented by the arrow 206 in FIG. 2, refers to the tracking generally of the bird 204 as it has moved between the images 200 and 202, and more particularly to the identification of corresponding pixels, or matching key pixels, of the images 200 and 202. That is, feature correspondence particularly refers to identification of the location of key pixels within the image 200, and their correspondence to pixels within the image 202, upon movement of the bird 204.

A pair of images from a single scene can generally be obtained in one of two manners. First, a single camera can be used to obtain sequential (from a time perspective) images of a scene, such as a hand-held camcorder recording a video sequence. This is shown in FIG. 4, where a single camera 402 is recording the scene 400 over time. Thus, different images over time are obtained by the camera 402. Second, two cameras can be used to obtain images from different perspectives of a scene. This is shown in FIG. 5, where a first camera 500 and a second camera 502 obtain images, such as snap-shop images, of the scene 400, from different perspectives. The single camera case of FIG. 4 thus represents a two-view motion geometry, while the two camera case of FIG. 5 represents a two-view stereo geometry.

In general, to obtain the feature correspondence between two images, such as two consecutive images obtained from a single camera, or two images obtained from two different cameras at different perspectives, what is known in the art as a fundamental matrix must be obtained. The fundamental matrix encodes the only geometric constraint that can be estimated between the two images, which is known in the art as the epipolar (geometry) constraint. In particular, the epipolar geometry represents the fact that a given point in a given scene and the two optical centers of two given images of the scene lie on the same (epipolar) plane. This means that a given a point in one of the images, its corresponding point in the other image must lie on a known (epipolar) line.

The epipolar geometrical constraint between two images is shown in FIG. 6. For a first image 600 and a second image 602, there is a first optical center 604 and a second optical center 606, respectively, such that a baseline 608 connects the optical centers 604 and 606. For a three-dimensional point 610, the first image 600 has a corresponding point 612, while the second image 602 has a corresponding point 614. The plane defined by the optical centers 604 and 606, and the three-dimensional point 610 is known as the epipolar plane. Furthermore, for the first image 600, the line passing through the point 612 and the point 616 of intersection of the baseline 608 with the image 600 is known as an epipolar line; the point 616 itself is known as an epipole. Likewise, for the second image 602, the line passing through the point 614 and the point 618 of intersection of the baseline 608 with the image 600 is also known as an epipolar line; the point 618 is also itself known as an epipole. Thus, the epipolar geometrical constraint between two images arises because, for image points 612 and 614 of the images 600 and 602, respectively, that correspond to the same three-dimensional point 610, the points 612 and 614, the three-dimensional point 610, and the optical centers 604 and 606 are coplanar.

As has been mentioned, the fundamental matrix is used to represent the epipolar geometrical constraint between two images, for feature correspondence therebetween. In particular, where $\{(x_\alpha, y_\alpha)\}$ and $\{(x'_\alpha, y'_\alpha)\}$, $\alpha=1, \ldots, N$, are image coordinates in pixels of two sets of N points of two different images—i.e., the image-coordinate system can be defined arbitrarily for each camera—hen two vectors can be defined, $$x_\alpha = \begin{pmatrix} x_\alpha/f_0 \\ y_\alpha/f_0 \\ 1 \end{pmatrix}, x'_\alpha = \begin{pmatrix} x'_\alpha/f_0 \\ y'_\alpha/f_0 \\ 1 \end{pmatrix},$$

where $f_0$ is a scale factor in pixels so that $x_\alpha/f_0$, $y_\alpha/f_0$, $x'_\alpha/f_0$, $y'_\alpha/f_0$ each have an order 1. The two sets of points are said to satisfy the epipolar constraint if there exists a matrix F of determinant 0 such that $$(x_\alpha, Fx'_\alpha)=0, \alpha 1, \ldots, N,$$

where the notation (a, b) specifies the inner product of vectors a and b. The matrix F is the fundamental matrix. The equation above is the necessary condition that the given corresponding points are images of the same points in the scene viewed from two cameras, or one moving camera.

Determining the fundamental matrix, therefore, is typically necessary in order to determine the feature correspondence between two images. Determining the fundamental matrix, however, can be a very difficult, as it often it must be estimated from image correspondences (a chicken and egg problem) which can only be determined when the fundamental matrix is known. The prior art particularly has difficulty with feature correspondence and determining the fundamental matrix—in two situations:

First, when the objects within an image have moved as many pixels compared to its location in the other image, or its image positions are otherwise far apart between the two images. This is referred to as the wide baseline problem. An example of this is shown in FIG. 2, where the bird 204 has moved not incrementally from the image 200 to the image 202, but rather has moved significantly from the left side as shown in the image 200, to the right side as shown in the image 202.

The second situation with which the prior art has particular difficulty with feature correspondence is when the objects within an image undergo large rotations (or other large image deformations such as shear caused by turning the camera or divergence caused by the camera zooming) as compared to another image. This is referred to as the image deformation problem. An example of this is shown in FIG. 3, where the bird 204 has been rotated ninety degrees counter-clockwise from its original orientation in the image 300, to its ultimate orientation in the image 302. Feature correspondence in such an example, as represented by the arrow 306, is generally difficult to accomplish within the prior art. For these and other reasons, therefore, there is a need for the present invention.

SUMMARY OF THE INVENTION

The present invention relates to feature correspondence between images using an image pyramid. In one embodiment, a computer-implemented method is proposed for generating a fundamental matrix between a first and a second image. The method first generates an image pyramid that has a predetermined number of fineness levels, ordered in fineness from a coarsest to a finest level. Each of the images has significant features at each level of the pyramid. The method next generates a plurality of hypotheses, also referred to as particles, for the fundamental matrix at the coarsest level of the pyramid, based on the significant features of the images at the coarsest level that match one another.

In an iterative procession through the levels of the image pyramid, starting at a present (also referred to as the current) level initially set to the coarsest level and then subsequently advanced by one fineness level upon each iteration, the method first formulates an importance sampling function from the hypotheses. The method then generates the plurality of hypotheses at the next level of the image pyramid based on the function, and on the significant features of the images at this next level. The iteration is complete when the next level has reached the finest level of the image pyramid. The hypotheses generated at the finest level represent the probability distribution of likely fundamental matrices between the images, together with the most likely fundamental matrix.

Embodiments of the invention provide for advantages not found within the prior art. In particular, it has been demonstrated that obtaining the fundamental matrix in accordance with embodiments of the invention provides for feature correspondence in wide baseline and image deformation situations, either better as compared to the prior art, or where the prior art could not provide for feature correspondence. Thus, embodiments of the invention provide for feature correspondence in more situations as compared to the prior art. Embodiments of the invention can also include construction of a three-dimensional model, compression, or other processing as a result of the fundamental matrix generated.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
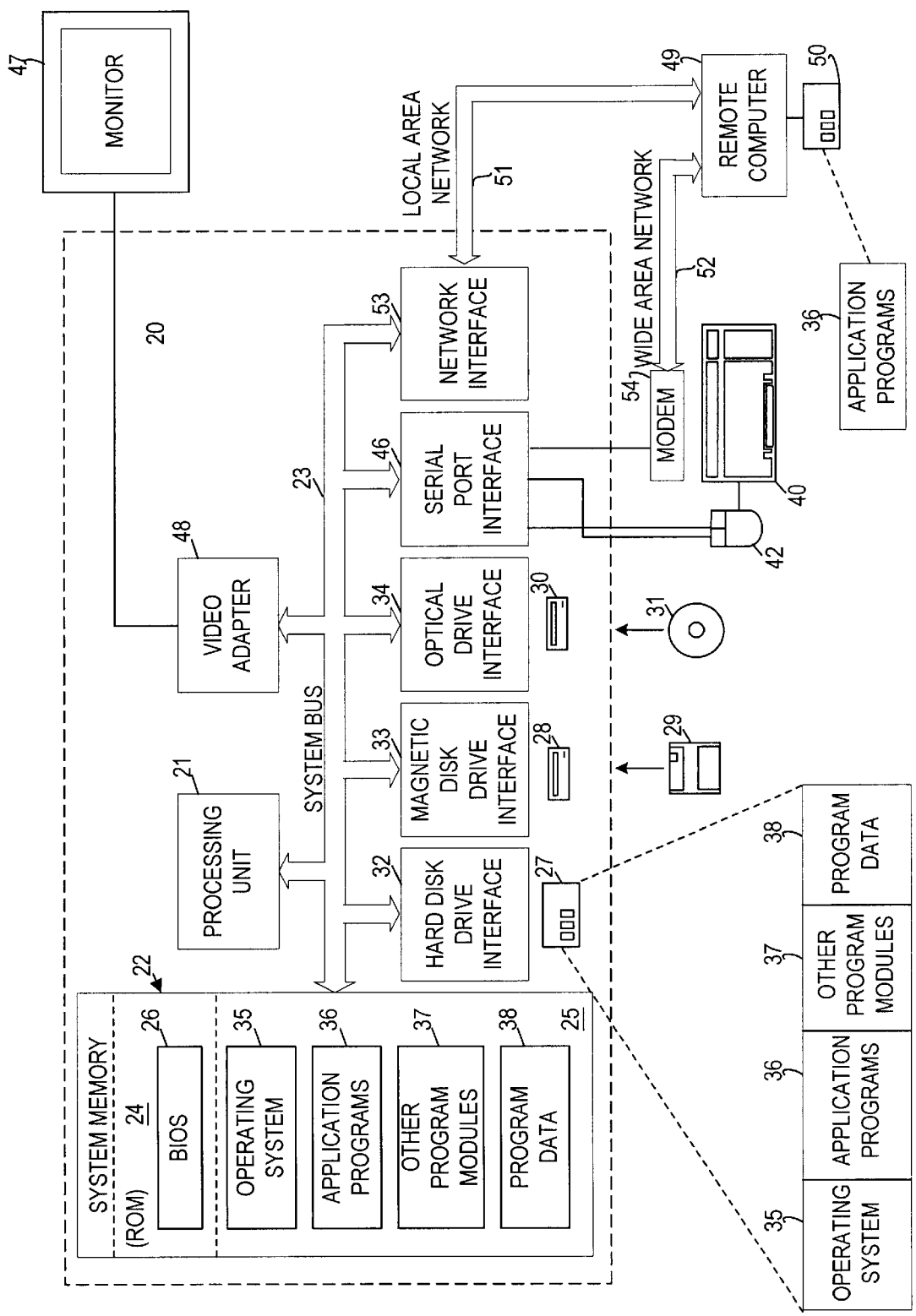
FIG. 1 is a diagram of an operating environment in conjunction with which embodiments of the invention can be practiced.
Figure 2:
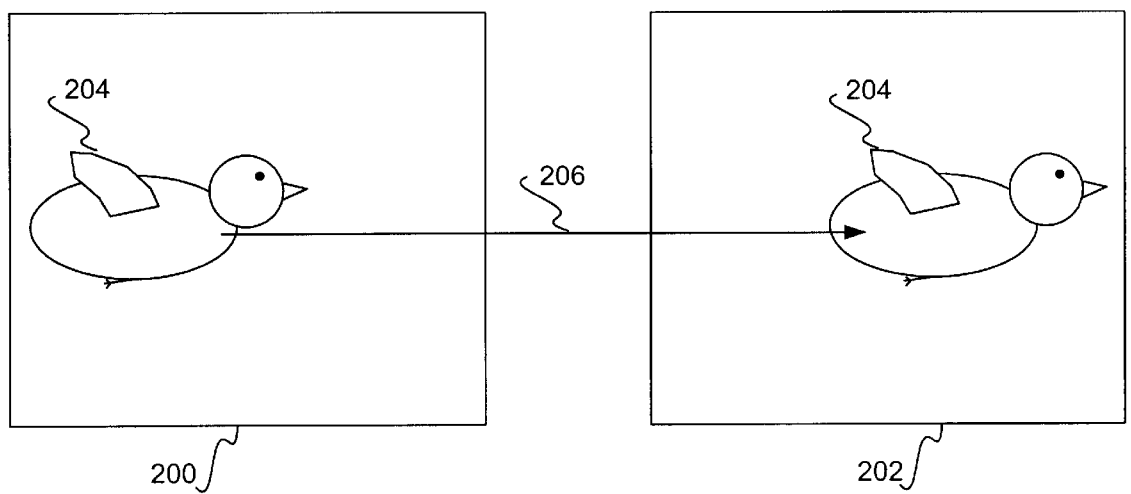
FIG. 2 is a diagram showing a wide baseline between images.
Figure 3:
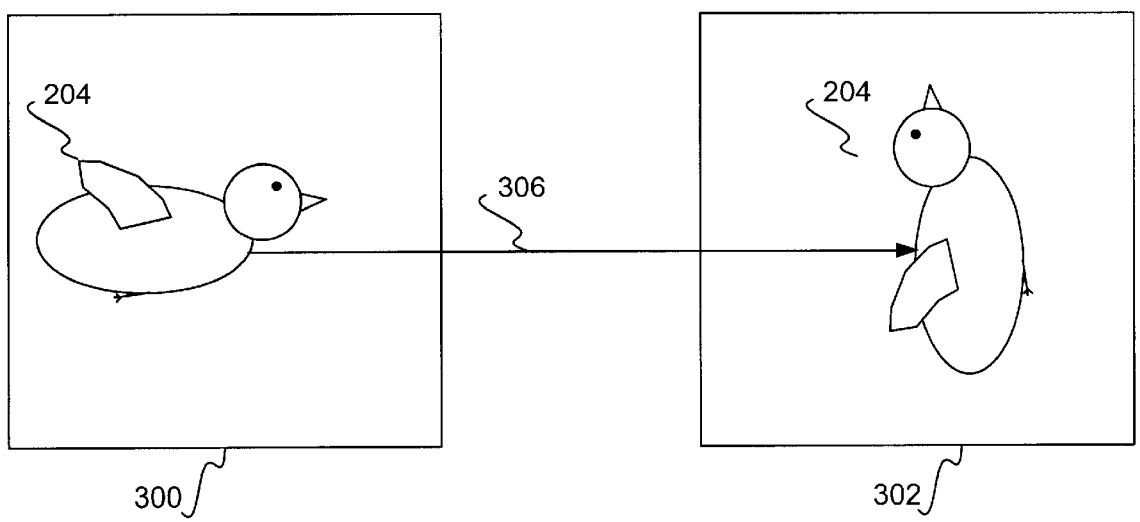
FIG. 3 is a diagram showing image deformation between images.
Figure 4:
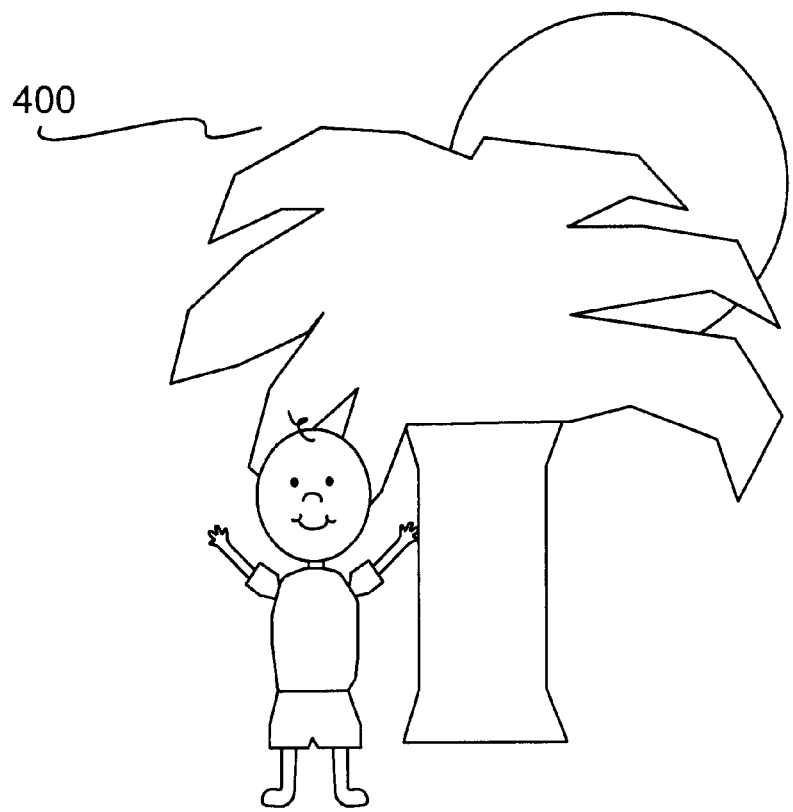
FIG. 4 is a diagram showing a single camera recording a scene over time to generate images.
Figure 4:
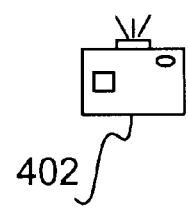
Figure 5:
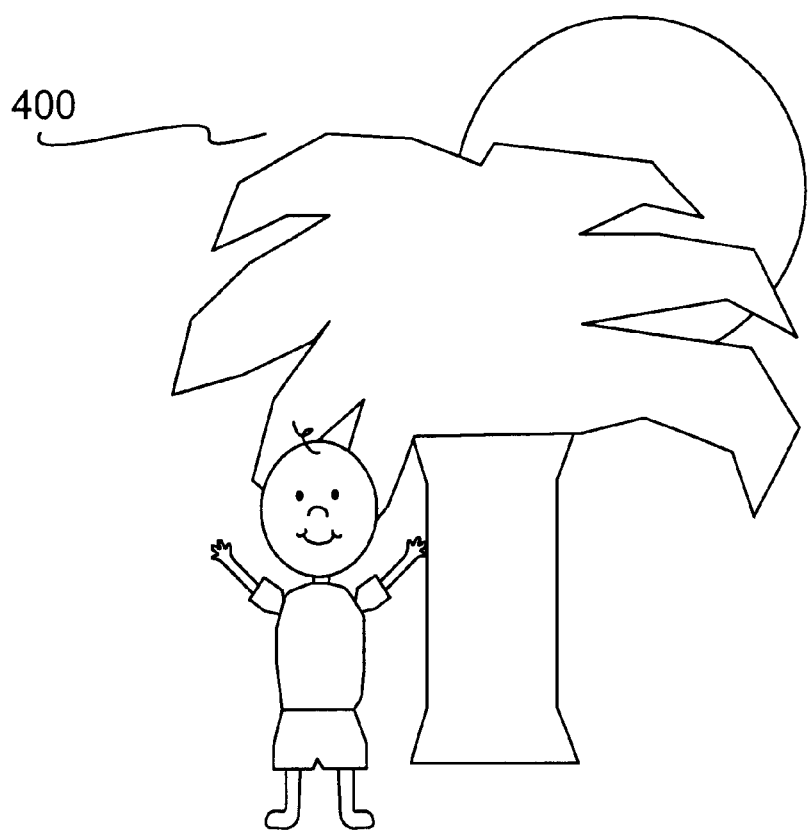
FIG. 5 is a diagram showing two cameras obtaining images of the same scene from different perspectives.
Figure 5:
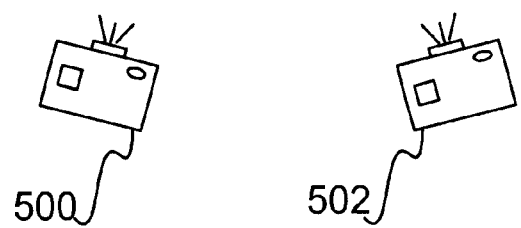
Figure 6:
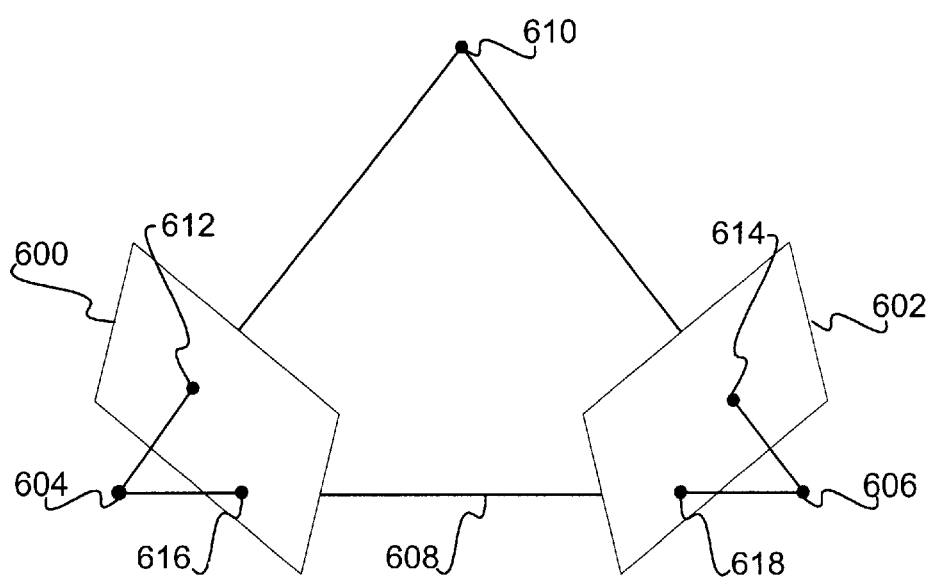
FIG. 6 is a diagram illustrating the epipolar geometrical constraint between two images of the same three-dimensional (3D) point of a scene.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Fundamental Matrix

In this section of the detailed description, further information regarding the fundamental matrix relation between two views, or images, of a given three-dimensional (3D) scene is presented. The images, as has been described in the background section, may come from the same camera, such that the images are sequential or consecutive images within a video sequence from the camera, or they may come from two different cameras, such that the images are likely taken at the same point in time, but from different perspectives of the scene. That is, two-view relations are described in this section of the detailed description.

It is first noted that throughout the detailed description, the image of a three-dimensional scene point X is denoted as $x^1$ in the first image, or view, and as $x^2$ in the second image, or view, where $x^1$ and $x^2$ are homogenous three vectors, $x=(x,y,1)^T$. The correspondence $x^1 \leftrightarrow x^2$ is denoted as $x^{1,2}$. Underlying a symbol $\underline{x}$ indicates the perfect or noise-free quantity, in distinction from $x=\underline{x}+\Delta x$, which is the measured value corrupted by noise.

Inclusive of the fundamental matrix, four possible relations $\mathcal{R}$ on the motion of points between two views, or images, are summarized in this section of the detailed description. These are: (1) the fundamental matrix; (2) the affine fundamental matrix; (3) the planar projection transformation, which is a homography; and, (4) the affinity. It is noted that all of these relations are estimable from image correspondence alone.

As has been described in the background section, the epipolar constraint is represented by the fundamental matrix. This relation applies for general motion and structure with uncalibrated cameras. An example is the movement of a set of point image projections from an object that undergoes a rotation and none-zero translation between views, or images. After the motion, the set of homogenous image points $\{\underline{x}_i\}$, $i=1, \ldots, n$, as viewed in the first image is transformed to the set $\{\underline{x}'_i\}$ in the second image, with the positions related by $$\underline{x}'_i{}^T F \underline{x}_i = 0 \quad (1)$$

where $\underline{x}=(\underline{x}, \underline{y}, 1)^T$ is a homogenous image coordinate and F is the fundamental matrix. The affine fundamental matrix $F_A$ is the linear version of F. The affine camera is applicable when the data is viewed under orthographic conditions and gives rise to a fundamental matrix with zeroes in the upper two-by-two submatrix.

In the case where all the observed points lie on a plane, or the camera rotates about its optic axis and does not translate, then all the correspondences lie on a homography:

$$\underline{x}' = H\underline{x}. \quad (2)$$

The affinity $H_A$ is a special case of the homography with zeros for the first two elements of the bottom row. Again, it is valid under uncalibrated orthographic conditions.

Maximum Likelihood Formulation for the Fundamental Matrix

The maximum likelihood formulation for computing any multiple-view relation, and including the fundamental matrix relation described in the previous section of the detailed description, is described in this section of the detailed description. An assumption is made that the noise in the two images is Gaussian on each image coordinate, with zero mean and uniform standard deviation $\sigma$. Thus, given a true correspondence, the probability density function of the noise perturbed data is $$p(x^{1,2}|\mathcal{R}) = \prod_{i=1\ldots n} \left(\frac{1}{\sqrt{2\pi}\,\sigma}\right)^n e^{-\left(\sum_{j=1,2}(x_i^j-\underline{x}_i^j)^2+(y_i^j-\underline{y}_i^j)^2\right)/(2\sigma^2)} \quad (3)$$

where n is the number of correspondences and $\mathcal{R}$ is a two-view relation, such as the fundamental matrix. The negative log likelihood of all the correspondences $X_i^{1,2}$, $i=1 \ldots n$ is $$-\sum_{i=1\ldots n} \log(p(x_i^{1,2}|\mathcal{R},\sigma)) = \frac{1}{2\sigma^2}\sum_{i=1\ldots n}\sum_{j=1,2}\left((x_i^j-\underline{x}_i^j)^2+(y_i^j-\underline{y}_i^j)^2\right) \quad (4)$$

discounting the constant term. It is inferred that the true relation $\mathcal{R}$ minimizes this log likelihood. This inference is referred to as the Maximum Likelihood Estimation.

Given two views with associate relation for each correspondence $x^{1,2}$ the maximum likelihood estimate, $\hat{x}^{1,2}$ of the true position $\underline{x}^{1,2}$, is determined, such that $\hat{x}^{1,2}$ satisfies the relation and minimizes $\Sigma_{j=1,2}(\hat{x}_i^j-x_i^j)^2+(\hat{y}_i^j-y_i^j)^2$. The Maximum Likelihood Estimation (MLE) error $e_i$ for the ith point is then $$e_i^2 = \sum_{j=1,2}(\hat{x}_i^j-x_i^j)^2+(\hat{y}_i^j-y_i^j)^2 \quad (5)$$

Thus, $\Sigma_{i=1\ldots n}e_i^2$ provides the error function for the point data, and the $\mathcal{R}$ for which $\Sigma_i e_i^2$ is minimized is the maximum likelihood estimate of the relation, such as the fundamental matrix.

This derivation assumes that the errors are Gaussian. However, features can be mismatched, such that the error on the match is not Gaussian. This error can be modeled as a mixture model of Gaussian and uniform distribution $$p(e) = \left(\gamma \frac{1}{\sqrt{2\pi\sigma^2}}\exp\left(-\frac{e^2}{2\sigma^2}\right)+(1-\gamma)\frac{1}{v}\right) \quad (6)$$

where $\gamma$ is the mixing parameter and $v$ is a constant; $\sigma$ is the standard deviation of the error on each coordinate. To correctly determine $\gamma$ and $v$ requires some knowledge of the outlier distribution. It is assumed that the outlier distribution is uniform, with $-v/2 \ldots +v/2$ being the pixel range within which outliers are expected to fall. It is noted that for featuring matching, this is determined by the size of the search window for the matches. Therefore, the error minimized is the negative log likelihood $$-L = -\sum_i \log\left(\gamma\left(\frac{1}{\sqrt{2\pi\sigma^2}}\right)^n\exp\left(-\left(\sum_{j=1,2}(x_i^j-\underline{x}_i^j)^2+(y_i^j-\underline{y}_i^j)^2\right)\Big/(2\sigma^2)+(1-\gamma)\frac{1}{v}\right)\right) \quad (7)$$

Augmented Fundamental Matrix and Maximum Likelihood Formulation Therefor

It is noted that the relation $\mathcal{R}$ that is being obtained in one embodiment of the invention is a particular form of the fundamental matrix referred to as the augmented, or in another embodiment the augmented affine fundamental matrix. However, as used in this application, the more general term fundamental matrix is said to include the augmented, or augmented affine fundamental matrix—for example, as recited in the claims. The augmented fundamental matrix itself is now described in more detail in this section of the detailed description; a maximum likelihood formulation for the augmented fundamental matrix is also described.

The augmented fundamental matrix is the fundamental matrix plus one or more homographies. The homographies estimated at the coarser level, such as in this fourth stage, are used to guide the search windows in order to detect matches for features at the finer levels. They can also be used to guide the cross-correlation matching at the finer levels in that patches that are correlated can be corrected by transformation under the homography. This representation is referred to as the augmented fundamental matrix $F^+$, or the augmented affine fundamental matrix $F_A^+$. In order to estimate this augmented relation, the likelihood for a match given this relation is decomposed into two parts: the first is the likelihood of the fundamental matrix, as has been described, and the second is the likelihood of the parallax in the image given the homography. This is assumed to be Gaussian with a large variance. This has the effect in general that if two equally good matches happen to lie along an epipolar line, the one closer to the base plane represented by the homography is favored.

In embodiments of the invention where the augmented fundamental matrix is used, an augmented maximum likelihood formulation is desirably also used, such that the likelihoods are extended to incorporate a term for the probability of the correlation conditioned on a given match and a given homography. Given the set of images (the data) $D_l$ at level l of the image pyramid, both the parameters of the relation S and the set of matches $\delta_i$, i=1 ... n need to be estimated. The ith match is encoded by $\delta_i$, which is the disparity of the ith feature of the first image. The set of disparities of all the features is $\Delta$. Thus, $$p(\theta,\Delta|D_l) \propto p(D_l|\theta,\Delta)p(\theta,\Delta) = p(D_l|\theta,\Delta)p(\Delta|\theta)p(\theta) \quad (8)$$

Under the assumption that the errors in each match are independent, $$p(\theta, \Delta | D_l) = \prod_i p(\theta, \delta_i | D_l) \propto \prod_i p(D_l | \theta, \delta_i)p(\delta_i | \theta)p(\theta) \quad (9)$$

This is the criterion to be optimized. However, only the augmented relation $\theta$ is propagated from the coarser level, as is described in more detail in the succeeding sections of the detailed description, and the matches are encoded by the homography part of $\theta$ and the disparity assigned to the parallax.

The probability of $\theta$ can be determined by integrating out the disparity parameters. Using the identity $$\int_{-\infty}^{+\infty} p(X, Y | I) dY = p(X | I),$$

$$p(\theta|D_l) \propto \int p(D_l|\theta,\delta_1)p(\delta_1|\theta)p(\theta)d\delta_1 \times \ldots \times \int p(D_l|\theta,\delta_n)p(\delta_n|\theta)d\delta_n \quad (10)$$

Since $\delta_i$ may take only a finite number of values, corresponding to the features j=1 ... m of the second image, $$p(\theta | D_l) \propto \prod_i \sum_j p(D_l | \theta, \delta_i = j)p(\delta_i = j | \theta)p(\theta) \quad (11)$$

Each term in this expression is the product of three elements. First, $p(D_l|\theta,\delta_i=j)$ is the likelihood of the image (patches) given the augmented fundamental matrix and the match $\delta_i=j$. This is evaluated from the cross-correlation score after warp under the homography part of $F^+$ under the assumption that the image intensities have Gaussian error mean zero and standard deviation $\theta_D$. The second term $p(\delta_i=j|\theta)$ is the likelihood of the match given the relation, given by equation (3) above. The third term $p(\theta)$ is the prior on the relation, which is assumed uniform, but which can be altered to include any appropriate prior knowledge.

It is noted, that to take account of occlusion, the disparity $\delta_i$ for a given match can take a null value, representing the fact that no match can be found with a some probability, which is $p(\delta_i=\emptyset)=\rho_1$. For this value of $\delta_i$, the conditional probability of the image patch correlation $p(D_l|\theta,\delta_i)$ is also set to a constant value $\rho_2$. The resulting estimate of $\theta$ remains constant over a large range of $\rho_{1,2}$.

Overview of a Specific Method According to an Embodiment of the Invention

In this section of the detailed description, an overview of a specific method according to an embodiment of the invention is described. Then, specific stages of the method are described in more detail in succeeding sections of the detailed description. That is, in this section of the detailed description, what is accomplished in the different stages of the method is described, while in the succeeding sections, how that accomplishment is achieved is described. In some embodiments, the method is computer-implemented. The computer-implemented method can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 7:
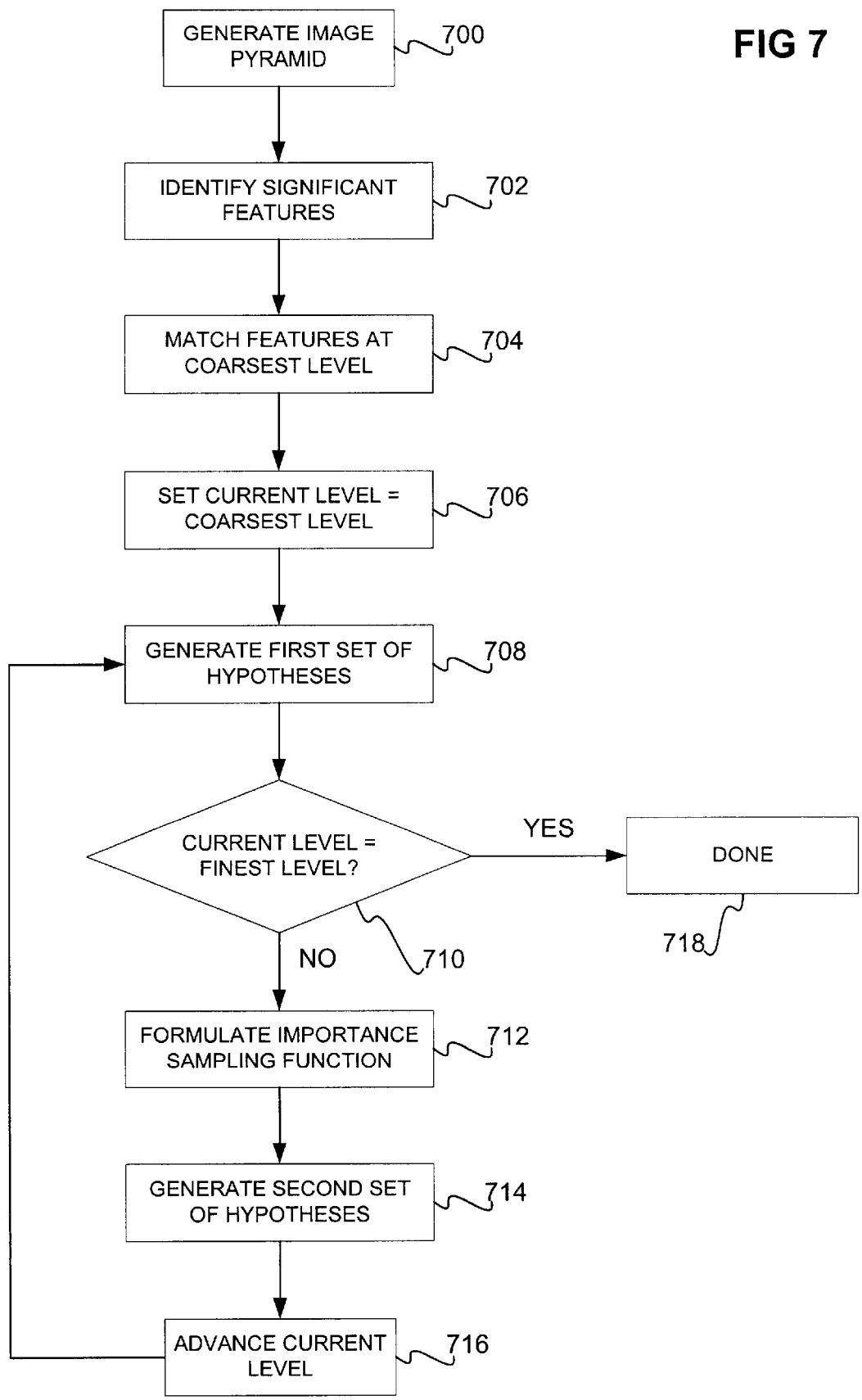
FIG. 7 is a flowchart of a specific method according to an embodiment of the invention.

Referring to FIG. 7, a flowchart of a specific method according to an embodiment of the invention is shown. The method is for generating a fundamental matrix between a first and a second image of a scene, such as may be obtained from a single camera generating consecutive images of the scene (from a time perspective), or from two cameras each generating an image of the scene from a different perspective. The fundamental matrix can then be used for corresponding all features between the two images. The invention is not limited to the type of features for which correspondence between the two images can be determined. However, in embodiments of the invention where the images each is made up of a plurality of pixels, the features can be pixels of the images. The fundamental matrix generated by the method of FIG. 7 particularly represents the correspondence of significant features between the images, as is determined by the method itself, such as the significant pixels between the images.

In 700, an image pyramid is generated for each image of the pair. To obtain the next coarsest level from the finer, the finer is blurred with a Gaussian convolution and then reduced to one quarter the area of the previous image. The image pyramid has a predetermined number of fineness levels, ordered in fineness from a coarsest level to a finest level. In one embodiment, the image pyramid has four fineness levels. Thus if the finest level has 512 by 512 pixel resolution, the coarser levels are 256 by 256, 128 by 128 and 64 by 64. 700 corresponds to the first stage of the method, as will be described in more detail in the next section of the detailed description.

Figure 8:
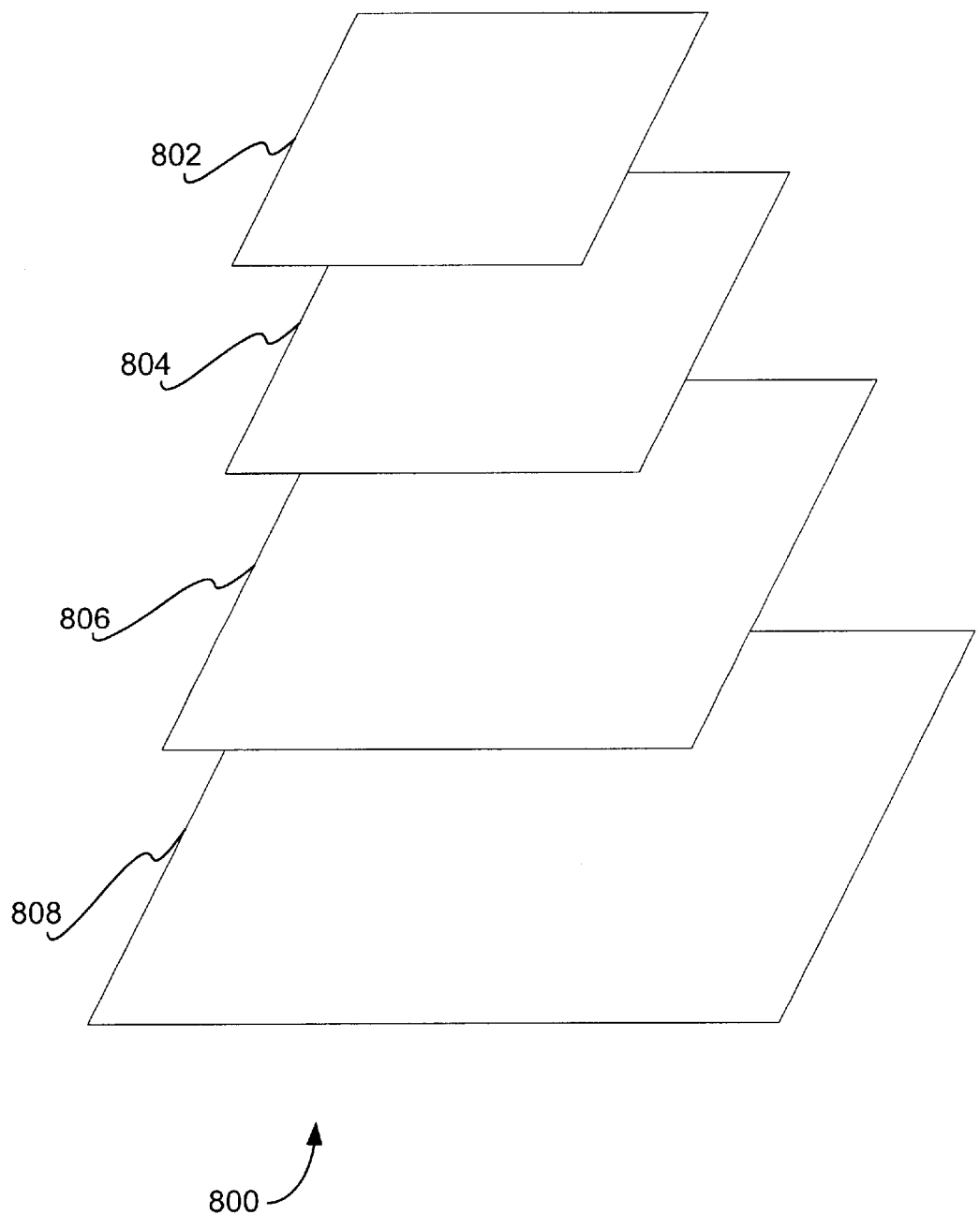
FIG. 8 is a diagram of an image pyramid according to an embodiment of the invention, in which there are four levels ordered from coarsest to finest; and, FIG. 9 is a flowchart of a general method according to an embodiment of the invention.

An example of an image pyramid is shown in FIG. 8. The image pyramid 800 has four levels ordered in fineness: a first level 802, a second level 804, a third level 806, and a fourth level 808. The first level 802 is the coarsest level of the pyramid 800, while the fourth level 808 is the finest level of the pyramid 800. The second and the third levels 804 and 806 thus have fineness in-between the coarsest level 802 and the finest level 808. The second level 804 is more coarse (less fine) than the third level 806. It is noted that the finest level 808 corresponds to the blurred base image, such that each coarser level (levels 806, 804 and 802) represent a successive reduction of the blurred base image.

Referring back to FIG. 7, in 702, the significant features of the first and the second images at all the levels of the image pyramid. As has been described, the significant features in one embodiment are the significant pixels of the images. The significant features can be generally and non-restrictively defined in a non-limited manner in one embodiment by the output of a feature detector (such as the Harris corner detector well known in the art). The feature detector looks for the center of distinctive shapes of pixels within the image. Such pixels indicated by the feature detector tend to be useful in that they are easier to match between images than other pixels due to the pattern surrounding them (for instance the center of a cross in the image would be easier to match to the center of a cross in the next image than one of its arms which cannot be distinguished after a rotation of the cross). 702 represents the second stage of the method, as will be described in a later section of the detailed description.

In 704, the features of the first image at the coarsest level are matched to the features of the second image at the coarsest level. It is noted that the coarsest level of the image pyramid is the most reduced level. Thus, feature matching is performed on the fewest number of pixels of the images, such that matching at the coarsest level is computationally efficient as compared to matching performed, for example, at the finest level of the pyramid. As will be described, this initial matching of features at the coarsest level is used to generate hypotheses, or particles, for the fundamental matrix at the coarsest level, which ultimately are passed down the image pyramid level-by-level, until ultimately the fundamental matrix has been generated at the finest level of the image pyramid, which is what is desired. 704 corresponds to the third stage of the method, as will be described in a later section of the detailed description.

In 706, a counter referred to as the present level is initially set as the coarsest level of the image pyramid, to set up the iterative process of generating fundamental matrix hypotheses at each level of the image pyramid, and passing this information down the pyramid until ultimately the fundamental matrix is generated at the finest level of the pyramid. In 708, a first set of hypotheses for the fundamental matrix is generated. In one embodiment, 500 hypotheses, or particles, are generated. In the case of the present level being equal to the coarsest level, this set of hypotheses is generated based on the significant features of the first and the second images as have been matched in 704. In the case of the present level being equal to any other level of the pyramid, this set of hypotheses is generated based on the significant features of the first and the second images at the present level, and also on a second set of hypotheses most recently generated at the previous (coarser) level in 714, as will be described. 708 represents the fourth stage of the method, as will be described in a later section of the detailed description.

In 710, it is determined whether the present level is equal to the finest level of the pyramid, such that the method has iteratively proceed through all the levels of the pyramid insofar as fundamental matrix generation—that is, first hypotheses therefor—is concerned. If so, then the method proceeds to 718, where it is finished. In such instance, the first set of hypotheses for the fundamentally matrix finally generated at the finest level of the image pyramid represents a set of fundamental matrices for feature correspondence between the first and the second image, together with their likelihoods. The most likely fundamental-matrix or most likely set of fundamental matrices can then be used to match the non-significant features of the images, such that various computer vision applications can thus be achieved, such as video sequence compression, three-dimensional (3D) scene reconstruction, etc., as can be appreciated by those of ordinary skill within the art.

If the present level has not yet reached the finest level of the pyramid, however, the method instead proceeds from 710 to 712. In 712, an importance sampling function is formulated from the first set of hypotheses most recently generated in 708. The importance sampling function is an approximation to the probability distribution function for the fundamental matrix represented by the first set of hypotheses. Then, in 714, a second set of hypotheses is generated at random at the present level of the image pyramid, based on the importance sampling function. That is, random particle samples are generated based on, that is, are drawn from, the distribution defined by the importance sampling function. In one embodiment this set of particles can be further improved by a method known in the art as importance resampling. In one embodiment, 500 such hypotheses, or particles, are created. 712 and 714 represent the fifth stage of the method.

From this second set of hypotheses at the present level, a new first set of hypotheses is generated at the next level, when the method returns back to 708 to generate another first set of hypotheses. Therefore, in 716, the present level is advanced by one level down the pyramid (i.e., at the next finer level), and the method returns back to 708 to generate another first set of hypotheses at this next finer level. Thus, the random particle samples drawn from one level based on the distribution defined by the sampling function, which itself was formulated from the first set of hypotheses at this level, propagate down to the next finer level, where another first set of hypotheses is generated (and in one embodiment improved by importance resampling). This process then repeats, until ultimately the finest level of the image pyramid is reached, and the fundamental matrix at the finest level is generated. Thus, information is propagated down the image pyramid, allowing for successive refinement of the fundamental matrix, from the initial coarse estimates to a fine-level estimate, by using samples based on importance sampling functions.

Each of the five stages of the method of FIG. 7 is now described in more detail in a separate section of the detailed description.

First Stage: Image Pyramid Generation

In this section of the detailed description, the manner by which an image pyramid is generated, according to an embodiment of the invention, is described. Such an image pyramid is shown in the already described FIG. 8, and is generated in the first stage of the method of FIG. 7 also already described. The image pyramid is generated by initially blurring the first and the second images together to form a base image. The base image is the finest level of the image pyramid. For each successive more coarse level of the pyramid, the image is repeatedly subsampled, as known within the art, by a factor of two. Thus, the level of the image above the finest level has one quarter the number of pixels as does the base image, the level after that has one sixteenth, and so on. In one embodiment, the subsampling process is performed three times, such that a total of four levels are generated (the base image level, plus three subsampled coarser levels).

Second Stage: Significant Features Determination

In this section of the detailed description, the manner by which significant features are determined at each level of the image pyramid, according to an embodiment of the invention, is described. Such significant features can be significant pixels in one embodiment, and are determined in the second stage of the method of FIG. 7 as already has been described. In general, the significant features are determined using a feature detector, as known within the art, and the invention is not limited to a particular type of feature detector. In one embodiment, the feature detector used is what is known in the art as the Harris corner detector, as specifically described in C. Harris and M. Stephens, A combined corner and edge detector, in the Proceedings of the Alvey Conference, pages 189–192 (1987). The Harris corner detector in particular detects the corners of significant objects within an image, to sub-pixel accuracy, such that these corners are used as the significant features.

Third Stage: Feature Matching at Coarsest Level

In this section of the detailed description, the manner by which features of both images are matched at the coarsest level of the image pyramid, according to an embodiment of the invention, is described. This third stage is performed in the method of FIG. 7 as already has been described. In general, the features are matched using a matching scorer, that is, a matching scoring mechanism, although the invention is not limited to a particular type of matching scorer. In one embodiment, the matching scorer is a cross-correlation scorer that uses a cross-correlation score to determine which of the features in the first image match which of the features in the second image, at the coarsest level. The cross correlation score is evaluated over a patch surrounding the feature pixel. In one embodiment, each patch undergoes a predetermined number of evenly spaced rotations, which is desirable if image deformation is expected.

Fourth Stage: (First) Hypotheses Generation

In this section of the detailed description, the manner by which the first set of hypotheses are generated, according to an embodiment of the invention, is described. This fourth stage is performed in the method of FIG. 7 as already has been described. The description in this section is specific to generation of the hypotheses at the coarsest level in that they are described as being generated from the significant features of the images at the coarsest level as have been matched. It is noted that subsequent iterations of the fourth stage, at levels more fine than the coarsest level, are performed such that the first set of hypotheses are generated at such a given level based on the significant features of first and the second images at the level, as well as based on the second set of hypotheses generated at the previous level. This is described in more detail in the next section of the detailed description, in conjunction with the description of the fifth stage.

In general, an approach that uses the hypothesis generation method of RANSAC, as known within the art, is used to generate a first set of hypotheses for the fundamental matrix, using the feature matches determined by the cross-correlation in the third stage. Each of these hypotheses is referred to as a particle. More particularly, a RANSAC-style hypothesis generation is used at the coarsest level to generate particles for the two-view image constraint $\mathcal{R}$, as has already been described (viz., $\mathcal{R}$ is a relation on the motion of points between two views of a scene). The two-view relation is in one embodiment an augmented fundamental matrix, which is a fundamental matrix plus a homography consistent with the fundamental matrix. This is akin to the plane plus parallax representation with the homography being used to help guide matching and to mitigate the effects of image deformation.

Thus, random sampling is used to generate an initial set of hypotheses: In order to generate a given particle, a minimal set of feature matches is chosen at random such that each match is picked in proportion to its correlation likelihood (here a minimal set if the minimum number of matches needed to estimate the particle). This process is repeated by sampling different minimal sets of matches such that a number of hypotheses for the fundamental matrix are generated, based on the feature matching of the previous (third) stage.

Hypothesis generation for robust estimation by random sampling is known within the art, and includes approaches such as MLESAC, LMS, and RANSAC. Such RANSAC-style approaches are particularly described in the references M. Fischler and R. Bolles, Random sample consensus, Communications of the ACM, vol. 24, pages 381–395 (1981); P. H. S. Torr and D. W. Murray, Outlier detection and motion segmentation, in P. S. Schenker, ed., Sensor Fusion VI, pages 432–443, SPIE vol. 2059 (Boston, 1993); Z. Zhang, et al., A robust technique for matching two uncalibrated images through the recovery of the unknown epipolar geometry, AI Journal, vol. 78, pages 87–119 (1994); and, P. H. S. Torr and A. Zisserman, Robust computation and parameterization of multiple view relations, in U. Desai, ed., ICCV6, pages 727–732 (Narosa Publishing House, 1998).

Fifth Stage: Importance Sampling Function and (Second) Hypotheses Generation In this section of the detailed description (the fifth stage of generation) creation of an importance sampling function from the first set of hypotheses generated in the fourth stage, and generating a second set of hypotheses from the importance sampling function, according to one embodiment of the invention, are both described. Two manners by which the importance sampling function can be generated are particularly described. It is noted that importance sampling is not used to generate the particles at the coarsest level, but only for propagation from one level to the next.

The objective in the coarse to fine method is to transmit information that can be quickly (at the expense of some accuracy) represented at the coarser level to the finer levels. This aids computation at the finer levels by furnishing a starting point for further optimization. Because the images computed at coarser levels are blurred the estimates of the particles are inaccurate, in order to represent these errors the probability distributions of the estimates (particles) must be encoded. The distribution of the parameters θ of the particles representing relation $\mathcal{R}$ given the data D at the coarsest level is $p(\theta|D)$. The information contained in this posterior distribution is then propagated down from coarser to the finer levels. This approach is beneficial for a number of reasons. It furnishes a solution to the wide baseline problem because the matching at the finer levels can be guided by the relations obtained at the finer levels, and thus the number of potential false matches per corner, is reduced at the coarser levels. Furthermore, at the coarser levels, it is less computationally intensive to estimate the global image deformation, by testing different hypotheses for the deformation of the cross correlation between image patches because estimates of this deformation can be passed down from the coarser levels of the pyramid.

However, there are two problems with encoding the probability distribution of the particles. First, the parametric form of the distribution is not known. Second, the normalization factor of the distribution is not known, i.e. if the probability of a particle is $$p(\theta|D_l) = \frac{p(D_l|\theta)p(\theta)}{p(D_l)} \quad (12)$$

it is only possible to evaluate the numerator, the denominator is unknown. The first problem is overcome by representing the distribution by a set of hypotheses, or particles, $\{\theta_1, \ldots \theta_m\}$. This set of particles is desirably drawn from the posterior distribution.

To obtain this second set of particles, what is referred to as importance sampling is used. Thus, suppose it is of interest to draw samples from such a distribution $q(\theta)$, and that there exists a normalized positive density function, the importance sampling function, $g(\theta)$ from which it is possible to draw samples. Then, 1. Generate a set of M draws $S^t = \{\theta_1, \ldots \theta_M\}$ from $g(\theta)$.
2. Evaluate $q(\theta)$ for each element of $S^t$.
3. Calculate importance weights $$\omega_i = \frac{q(\theta_i)}{g(\theta_i)}$$

or each element of $S^t$.

4. Sample a new draw from $S^{t+1}$ from $S^t$ where the probability of taking a new $\theta_i$ is proportional to its weight $\omega_i$ (This is known in the art as importance resampling).

Iterating this procedure from 2 is referred to as importance sampling followed by importance resampling. This process, in the limit, produces a fair sample from the distribution $q(\theta)$. The rate of convergence is determined by the suitability of the importance function $g(\theta)$. The worst possible scenario occurs when the importance ratios are small with high probability and large with low probability.

To choose a good importance sampling function, the hypothesis generation part of RANSAC is used, as is now described. This is the first manner for generating an importance sampling function, and can be used at any level of the image pyramid, including at the coarsest level. The importance function $g(\theta)$ is modeled as a mixture of Gaussians in fundamental matrix parameter space, each centered at the parameters of a particle, with the mixing parameters being in proportion to the posterior likelihood of each sample, $p(\theta|D)$, in one embodiment or the importance weight in another embodiment. Thus, probabilities can be propagated by generating a probability density function $g(\theta)$ from the set of particles (each with an associated weight and posterior likelihood previously evaluated) using this as an importance sampling function to generate the next set of particles.

Two ways to speed up the manner in which the sampling function is determined are next described. First, using all the particles to generate the mixture of Gaussians can be slow (being proportional to the square of the number of particles). Generally, then, if the distribution is to be represented by L particles, a particle can be excluded from the determination if it contains less than 1/L of the mass of the density function. Second, the artifice of constructing the mixture of Gaussians can be often computationally onerous. Therefore, a simpler device can be obtained under the assumption that the initial set of particles generated by the random sampling of minimal match sets is uniform. This suggests a second manner by which to generate the importance sampling function, Thus in the second manner the importance sampling $g_l(\theta)$ at a level l other than the coarsest level, is represented using the set of particles $S^l$ (delta functions) at the level l, where each is assigned a probability $p(\theta_i)=\pi_i$, where $$\pi_i = \frac{\omega(\theta_i)}{\sum_j \omega(\theta_j)} \text{ and} \quad (13)$$

$$\omega(\theta_i) = \frac{p(\theta_i|D_l)}{g_{l-1}(\theta_i)}. \quad (14)$$

This is equivalent to just the performing importance resampling on the particles, using the information at each new level of fineness to re-choose the particles. A difficulty with resampling is that one particle $\theta_{max}$ may come to represent all the probability mass at a given level, and hence all the particles at the finer level will be replicas thereof. One solution is to add a small amount of noise, compensated for by subtracting it from the prior $p(\theta)$, to each particle as it is transmitted to the next level.

General Method

In this section of the detailed description, a more general method according to an embodiment of the invention is described. In some embodiments, the method is computer-implemented. The computer-implemented method can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 9:
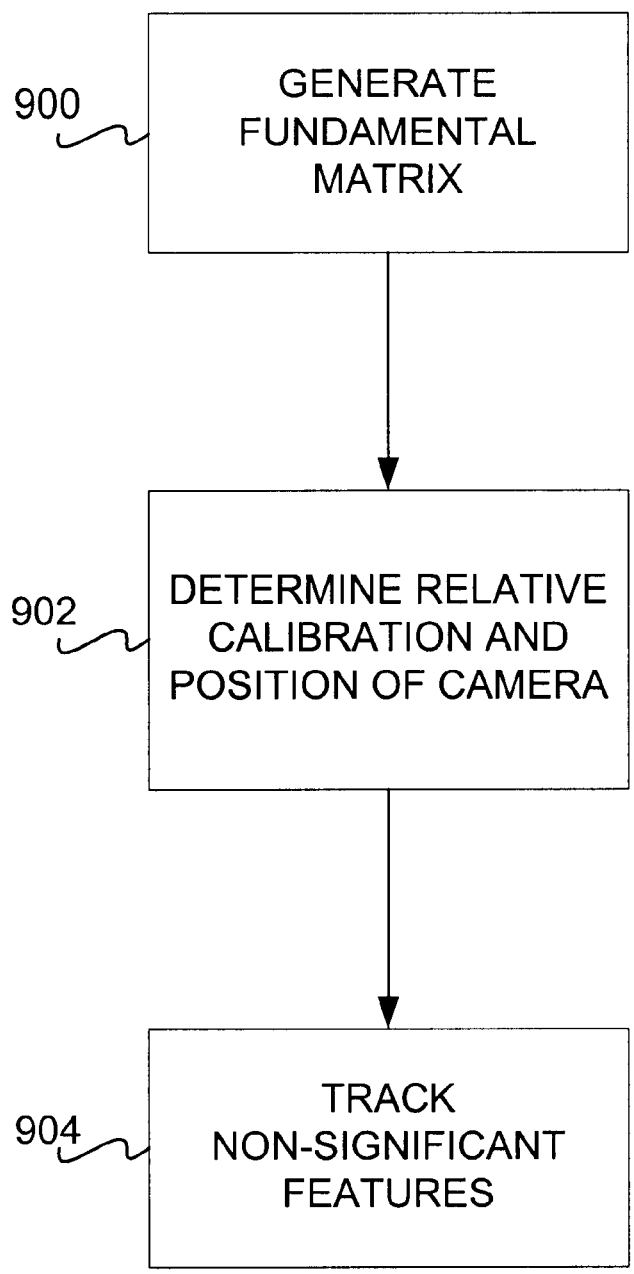

Referring to FIG. 9, a flowchart of a general method according to an embodiment of the invention is shown. End uses of the method include creating a three-dimensional (3D) virtual reality model, compressing a sequence of images, etc.; the invention is not so limited. In 900, a fundamental matrix is generated between a first and a second image, such as of a video sequence, based on iterative processing through a number of fineness levels of an image pyramid, using significant features of each image at each level of the pyramid.

In one embodiment, this is accomplished as has been described in the preceding sections of the detailed description. A summary of this approach is
1. At each level: Detect features.
2. Putative matching of corners over the coarsest two images using proximity and cross correlation under a variety of rotations.
3. At the coarsest level. Generate a set of particles $S^0 = \{\theta_m^0\}$ and weights $\{\omega_m^0\}$, m=1 ... M as follows:
  a. Select a random sample without replacement of the minimum number of correspondences required to estimate the relation $\mathcal{R}$.
  b. Calculate $\theta_i^0$ from this minimal set.
  c. Calculate $\omega_i^0 = p(\theta|D_0)$ for each sample.
4. For l=1 to l=finest level
  a. Generate an importance sampling function $g_l(\theta)$ from $S^{l-1}$.
  b. Generate M draws from $g_l$, to generate $S^l$.
  c. For each $\theta_i^l$, calculate $\omega_i^l = p(\theta_i^l|D_l)/g_l(\theta_i^l)$.
5. The particle with the maximum posterior probability is taken as the MAP estimate. This can then be used as a starting point for a gradient descent algorithm.

It is noted, however, that the numbers as used in the above summary, while totaling five, do not correspond to the five stages of the method as has been previously described.

Next, in 902, the relative calibration and position of a camera for each of the first and the second images is determined, based on the fundamental matrix generated in 900. Such determination is known within the art. In particular, there can be one camera, such that both of the images are part of a temporal sequence of images, or there can be two cameras, such that each image is taken from a different camera at a different perspective of a scene. Finally, in 904, the non-significant features, such as the non-significant pixels, of each of the first and the second images are tracked—that is, determined—based on the relative calibration and position of the camera determined in 902. Such determination is also known within the art. Once 902 and 904 have been performed, in conjunction with the fundamental matrix determination, the method of FIG. 9 can then be used for an end use. Such end uses can include compression, 3D virtual scene reconstruction, etc.; the invention is not so limited.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method for generating a fundamental matrix between a first image and a second image comprising:
   generating an image pyramid having a predetermined number of fineness levels, ordered in fineness from a coarsest level to a finest level;
   identifying significant features of each of the first and the second images at each of the levels of the image pyramid, using a feature detector;
   matching the significant features of the first image with the significant features of the second image at the coarsest level of the image pyramid, using a matching scorer;
   generating a first plurality of hypotheses for the fundamental matrix at the coarsest level of the image pyramid, based on the significant features of the first and the second images at the coarsest level as have been matched;
   setting a present level of the image pyramid as the coarsest level;
   repeating
      formulating an importance sampling function from the first plurality of hypotheses as has been most immediately generated;
      generating a second plurality of hypotheses for the fundamental matrix at the present level of the image pyramid, at random, based on the importance sampling function;
      advancing the present level down the image pyramid by one fineness level;
      generating the first plurality of hypotheses for the fundamental matrix at the present level of the image pyramid, based on the second plurality of hypotheses as has been most immediately generated and on the significant features of the first and the second images at the present level;
   until the present level of the image pyramid is at the finest level of the image pyramid,
      wherein the first plurality of hypotheses for the fundamental matrix finally generated at the finest level of the image pyramid represents the fundamental matrix between the first image and the second image.

2. The method of claim 1, wherein the coarsest level of the image pyramid corresponds to a reduced image and the finest level of the image pyramid corresponds to a base image.

3. The method of claim 1, wherein the significant features of the first and the second images comprise significant pixels of each of the first and the second images, respectively.

4. The method of claim 1, wherein the feature detector comprises a Harris corner detector.

5. The method of claim 1, wherein the matching scorer comprises a cross-correlation scorer.

6. The method of claim 1, wherein the first plurality of hypotheses for the fundamental matrix at the coarsest level of the image pyramid is generated using a RANSAC-type approach.

7. The method of claim 1, wherein each of the first plurality and the second plurality of hypotheses for the fundamental matrix is referred to as a particle.

8. The method of claim 1, wherein the importance sampling function comprises a probability distribution function.

9. A computer-implemented method for generating a fundamental matrix between a first image and a second image comprising:
   generating an image pyramid having a predetermined number of fineness levels, ordered in fineness from a coarsest level to a finest level, each of the first and the second images having significant features at each level of the image pyramid;
   generating a plurality of hypotheses for the fundamental matrix at the coarsest level of the image pyramid, based on the significant features of the first and the second images at the coarsest level that match one another; and, in an iterative procession through the levels of the image pyramid, where a present level is initially set to the coarsest level and is advanced by one fineness level upon each iteration, formulating an importance sampling function from the plurality of hypotheses, generating the plurality of hypotheses at a next level of the image pyramid based on the function and on the significant features of the first and second images at the next level, until the next level is at the finest level of the image pyramid, wherein the plurality of hypotheses generated at the finest level represents the fundamental matrix between the first and second images.

10. The method of claim 9, wherein the significant features of the first and the second images comprise significant pixels of each of the first and the second images, respectively.

11. The method of claim 9, further comprising prior to generating the plurality of hypotheses for the fundamental matrix at the coarsest level of the image pyramid, identifying the significant features of each of the first and the second images at each of the levels of the image pyramid, using a feature detector.

12. The method of claim 11, wherein the feature detector comprises a Harris corner detector.

13. The method of claim 9, further comprising prior to generating the plurality of hypotheses for the fundamental matrix at the coarsest level of the image pyramid, matching the significant features of the first image with the significant features of the second image at the coarsest level of the image pyramid, using a matching scorer.

14. The method of claim 13, wherein the matching scorer comprises a cross-correlation scorer.

15. The method of claim 9, wherein the plurality of hypotheses is generated using a RANSAC-type approach.

16. The method of claim 9, wherein the importance sampling function comprises a probability distribution function.

17. The method of claim 9, wherein generating the plurality of hypotheses at the next level of the image pyramid based on the function and on the significant features of the first and the second images at the next level comprises:

generating a second plurality of hypotheses for the fundamental matrix at the present level, at random, based on the importance sampling function; and, generating the plurality of hypotheses at the next level of the image pyramid from the second plurality of hypotheses as has been most immediately generated and on the significant features of the first and the second images at the next level.

18. A computer-implemented method comprising:

generating a fundamental matrix between a first image and a second image based on iterative processing through a plurality of fineness levels of an image pyramid using significant features of each of the first and the second images at each of the levels of the image pyramid;

determining a relative calibration and position of a camera for each of the first and the second images based on the fundamental matrix; and, tracking non-significant features of each of the first and the second images based on the relative calibration and position of the camera for each of the first and the second images.

19. The method of claim 18, wherein the method is for creating a three-dimensional (3D) virtual reality model.

20. The method of claim 18, wherein the method is for compressing the first and the second images.

21. The method of claim 18, wherein the significant features comprise significant pixels, and the non-significant features comprise non-significant pixels.

22. The method of claim 18, wherein generating the fundamental matrix comprises:

generating the image pyramid;

generating a plurality of hypotheses for the fundamental matrix at the coarsest level of the image pyramid, based on the significant features of the first and the second images at the coarsest level that match one another; and in an iterative procession through the levels of the image pyramid, where a present level is initially set to the coarsest level and is advanced by one fineness level upon each iteration, formulating an importance sampling function from the plurality of hypotheses, generating the plurality of hypotheses at a next level of the image pyramid based on the function and on the significant features of the first and second images at the next level, until the next level is at the finest level of the image pyramid, wherein the plurality of hypotheses generated at the finest level represents the fundamental matrix.

23. The method of claim 22, wherein generating the fundamental matrix further comprises, prior to generating the plurality of hypotheses for the fundamental matrix at the coarsest level of the image pyramid, identifying the significant features of each of the first and the second images at each of the levels of the image pyramid, using a feature detector.

24. The method of claim 22, wherein generating the fundamental matrix further comprises, prior to generating the plurality of hypotheses for the fundamental matrix at the coarsest level of the image pyramid, matching the significant features of the first image with the significant features of the second image at the coarsest level of the image pyramid, using a matching scorer.

25. The method of claim 22, wherein generating the plurality of hypotheses at the next level of the image pyramid based on the function and on the significant features of the first and the second images at the next level comprises:

generating a second plurality of hypotheses for the fundamental matrix at the present level, at random, based on the importance sampling function; and, generating the plurality of hypotheses at the next level of the image pyramid from the second plurality of hypotheses as has been most immediately generated and on the significant features of the first and the second images at the next level.

26. A computer-readable medium having computer-executable instructions for performing the computer-implemented method of claim 18.

27. A computer system, comprising:

means for generating a fundamental matrix between a first image and a second image based on iterative processing through a plurality of fineness levels of an image pyramid using significant features of each of the first and the second images at each of the levels of the image pyramid; and means for determining non-significant features of each of the first and the second images.

* * * * *